(12) United States Patent
Dudyala et al.

(10) Patent No.: US 10,871,543 B2
(45) Date of Patent: Dec. 22, 2020

(54) DIRECTION OF ARRIVAL ESTIMATION OF ACOUSTIC-SIGNALS FROM ACOUSTIC SOURCE USING SUB-ARRAY SELECTION

(71) Applicant: KAAM LLC., Saratoga, CA (US)

(72) Inventors: Tejaswini Dudyala, Hyderabad (IN);
Srivally Munnangi, Hyderabad (IN);
Senthil Kumar Mani, Hyderabad (IN)

(73) Assignee: KAAM LLC, Saratoga, CA (US)

( * ) Notice: Subject to any disclaimer, the term of this patent is extended or adjusted under 35 U.S.C. 154(b) by 394 days.

(21) Appl. No.: 16/006,362

(22) Filed: Jun. 12, 2018

(65) Prior Publication Data

US 2019/0377056 A1    Dec. 12, 2019

(51) Int. Cl.
| | | |
|---|---|---|
| *G01S 3/80* | (2006.01) | |
| *G01S 3/808* | (2006.01) | |
| *H04R 1/40* | (2006.01) | |
| *G01S 3/801* | (2006.01) | |
| *H04R 3/00* | (2006.01) | |

(52) U.S. Cl.
CPC ............ *G01S 3/8083* (2013.01); *G01S 3/808* (2013.01); *H04R 1/406* (2013.01); *G01S 3/801* (2013.01); *H04R 3/005* (2013.01); *H04R 2201/401* (2013.01); *H04R 2201/405* (2013.01)

(58) Field of Classification Search
CPC ........ G01S 3/8083; G01S 3/808; G01S 3/801; H04R 1/406; H04R 2201/405; H04R 2201/401

See application file for complete search history.

(56) References Cited

U.S. PATENT DOCUMENTS

| | | |
|---|---|---|
| 7,970,150 B2 | 6/2011 | Oxford |
| 9,360,546 B2 | 6/2016 | Kim et al. |
| 2012/0051548 A1* | 3/2012 | Visser ................. G10L 21/0208 381/56 |
| 2014/0044274 A1 | 2/2014 | Ebenezer |
| 2019/0090052 A1* | 3/2019 | Radmanesh ........... H04R 3/005 |

* cited by examiner

*Primary Examiner* — Ian J Lobo (74) *Attorney, Agent, or Firm* — Chip Law Group (57) ABSTRACT

A system that handles direction of arrival (DOA) estimation for acoustic signals using sub-array selection, identifies a plurality of microphone sub-arrays from the plurality of microphones in the microphone-array, selects a set of microphone sub-arrays from the plurality of microphone sub-arrays, and computes a relative time-delay for arrival of the acoustic signals between each pair of microphones of the selected set of microphone sub-arrays. The selection is based on a maximum distance between each pair of microphones of the identified plurality of microphone sub-arrays of the microphone-array. A first microphone sub-array is determined from the selected set of microphone sub-arrays and the DOA of the acoustic signals is estimated with reference to the determined first microphone sub-array. The estimation of the direction of arrival of the acoustic signals is based on the computed relative time-delay for the determined first microphone sub-array of the microphone-array.

20 Claims, 5 Drawing Sheets

DIRECTION OF ARRIVAL ESTIMATION OF ACOUSTIC-SIGNALS FROM ACOUSTIC SOURCE USING SUB-ARRAY SELECTION

CROSS-REFERENCE TO RELATED APPLICATIONS/INCORPORATION BY REFERENCE

None.

FIELD OF TECHNOLOGY

Certain embodiments of the disclosure relate to direction of arrival estimation technologies. More specifically, certain embodiments of the disclosure relate to estimation of direction of arrival of signals from an acoustic source using sub-array selection.

BACKGROUND

The direction of arrival (DOA) estimation of acoustic signals is an active area of research for different applications, such as virtual assistants, camera pointing systems (in video conferencing), teleconferencing, improved human-machine interactions, voice activated devices, home automation, and the like. An accurate DOA estimation further contributes to enhancement in automatic speech recognition of distant or differentially positioned users, spatial audio coding, and separation of different acoustic sources in a given acoustic data.

Many DOA estimation techniques have been proposed and have evolved from the origin of antenna theory to the present-day technologies. Among these techniques, time-delay-of-arrival (TDOA) based DOA estimation, Multiple Signal Classification (MUSIC), Steered Response Power-Phase Transform (SRP-PHAT) and Generalized Cross Correlation (GCC), and estimation of signal parameters based on rotational invariance (ESPRIT) techniques have received considerable attention as they provide reasonable DOA accuracy in certain application scenarios. Such aforementioned techniques may differ based on different levels of implementation complexity. For example, MUSIC method may require different a priori knowledge of acoustic sources to operate, which may be unavailable or difficult to model in complex acoustic scenarios.

MUSIC is further known to operate in moderate and high signal-to-noise ratio (SNR) conditions; however, it barely works when the SNR is low. Further, there is an imbalance between computational complexity and accuracy with applications or systems that employ the MUSIC technique for DOA estimation. The SRP-PHAT technique is computationally very intensive as it considers all the correlations of microphone pairs followed by a search process in the DOA estimation. Additionally, for SRP-PHAT technique, the direction of the reflections of the acoustic signals from a speaker may exhibit greatest steered power, which may result in inaccurate DOA estimation. Similarly, for the GCC method, the maximum cross-correlation could occur at a spurious delay if the system is used in reverberant environments. Such spurious delay may be created by the ensuing reflections that result in inaccurate DOA estimation. Therefore, the aforementioned techniques poses a challenge to provide a computationally less intensive solution for DOA estimation of acoustic signals in lesser amount of time and thus, ensuring a high throughput of DOA estimation data.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for estimation of direction of arrival of signals from an acoustic source using sub-array selection, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a system and method for estimation of direction of arrival of acoustic signals using sub-array selection. The present disclosure may provide several advantages over the traditional direction of arrival (DOA) estimation solutions. In contrast to conventional techniques, such as SRP-PHAT or GCC, where DOA is estimated using time-delays of all the possible pairs of microphones, the disclosed system and method provides a robust and optimal solution, where DOA may be estimated using the time-delays of only selected sub-arrays of a microphone-array. The sub-array selection (i.e., decomposition) feature facilitates in filtering out the undesired pairs from the possible pairs of microphones with effective thresholding. This reduces the computational complexity and enables a faster estimation of DOA.

Various embodiments of the disclosure provide a system that may include a microphone-array comprising a plurality of microphones. The system may further include a signal processing apparatus communicatively coupled to the microphone-array. The signal processing apparatus may comprise a plurality of circuits (hereinafter, referred to as "circuits"). The circuits may be configured to identify a plurality of microphone sub-arrays from the plurality of microphones in the microphone-array. Each microphone sub-array of the identified plurality of microphone sub-arrays may comprise a pair of microphones spaced apart by a specific distance. The circuits may be further configured to select a set of microphone sub-arrays from the identified plurality of microphone sub-arrays of the microphone-array. The selection may be based on a maximum distance between each pair of microphones of the plurality of microphone sub-arrays of the microphone-array. A relative time-delay may be further computed for an arrival of the acoustic signals between each pair of microphones of the selected set of microphone sub-arrays. The relative time-delay may correspond to an estimated time-delay for the arrival of acoustic signals between each pair of microphones of the selected set of microphone sub-arrays. Further, the circuits may be configured to determine a first microphone sub-array from the selected set of microphone sub-arrays. The first microphone sub-array may be determined based on a maximum time-delay from the computed relative time-delay for each of the selected set of microphone sub-arrays. The first microphone sub-array may be a desired microphone sub-array determined from the identified plurality of microphone sub-arrays in the microphone-array. The circuits may further estimate a direction of arrival (DOA) of the acoustic signals with reference to the determined first microphone sub-array, based on the computed relative time-delay for arrival of the acoustic signals at the determined first microphone sub-array.

In accordance with an embodiment, the direction of arrival of the acoustic signals with reference to the determined first microphone sub-array may be estimated based on one or more parameters. The one or more parameters may comprise a sampling frequency of the acoustic signals, a speed of the acoustic signals, the computed relative time-delay for the determined first microphone sub-array, and a radius associated with a planar arrangement of the microphones in the microphone-array. Further, the direction of arrival of the acoustic signals may be estimated in one of a frequency domain and a time domain and a direction that corresponds to a location of the signal source is same as the direction of arrival of the acoustic signals.

In accordance with an embodiment, the direction of arrival of the acoustic signals with reference to the determined first microphone sub-array may be estimated based on a digital filter that processes the acoustic signals received at a first microphone and a second microphone of the determined first microphone sub-array. The digital filter for the estimation of the direction of arrival of the acoustic signals may be one of an infinite impulse response (IIR) filter or finite impulse response (FIR) filter. The digital filter may process the acoustic signals based on one of a cross-correlation, a Fast Fourier Transform (FFT), a Discrete Fourier Transform (DFT) of the acoustic signals received at the first microphone and the second microphone of the determined first microphone sub-array.

The plurality of circuits may be further configured to determine the specific distance between the pair of microphones of the plurality of microphone sub-arrays of the microphone-array. The plurality of microphones may be arranged in the microphone-array in a regular convex polygon arrangement such that each microphone in the microphone-array may be arranged at vertices of the regular convex polygon. The selection of the set of microphone sub-arrays from the microphone-array may be based on a planar arrangement of the set of microphone sub-arrays that bisect each other in the microphone-array.

The first microphone sub-array may be determined from the selected set of microphone sub-arrays based on a maximum of the computed relative time-delay among the selected set of microphone sub-arrays. The relative time-delay for the selected set of microphone sub-arrays may be computed based on a cross-correlation of the acoustic signals received at two different microphones of the selected set of microphone sub-arrays. The computation of the relative time-delay may be done for each selected microphone sub-array instead of computation of the relative time-delay for each microphone sub-array in the microphone-array.

The disclosed system and method proactively mitigates a possibility that the time-delay of determined first microphone sub-array (i.e., the desired microphone sub-array) may be dominated by time-delays of other microphone sub-arrays, which may result in inaccurate estimation of DOA. The disclosed method proactively mitigates such possibility of inaccurate estimation with efficient thresholding of time-delays. The precise DOA estimation may further facilitate dependent systems to precisely deliver solutions for different applications, in a robust and adaptive manner.

Figure 1:
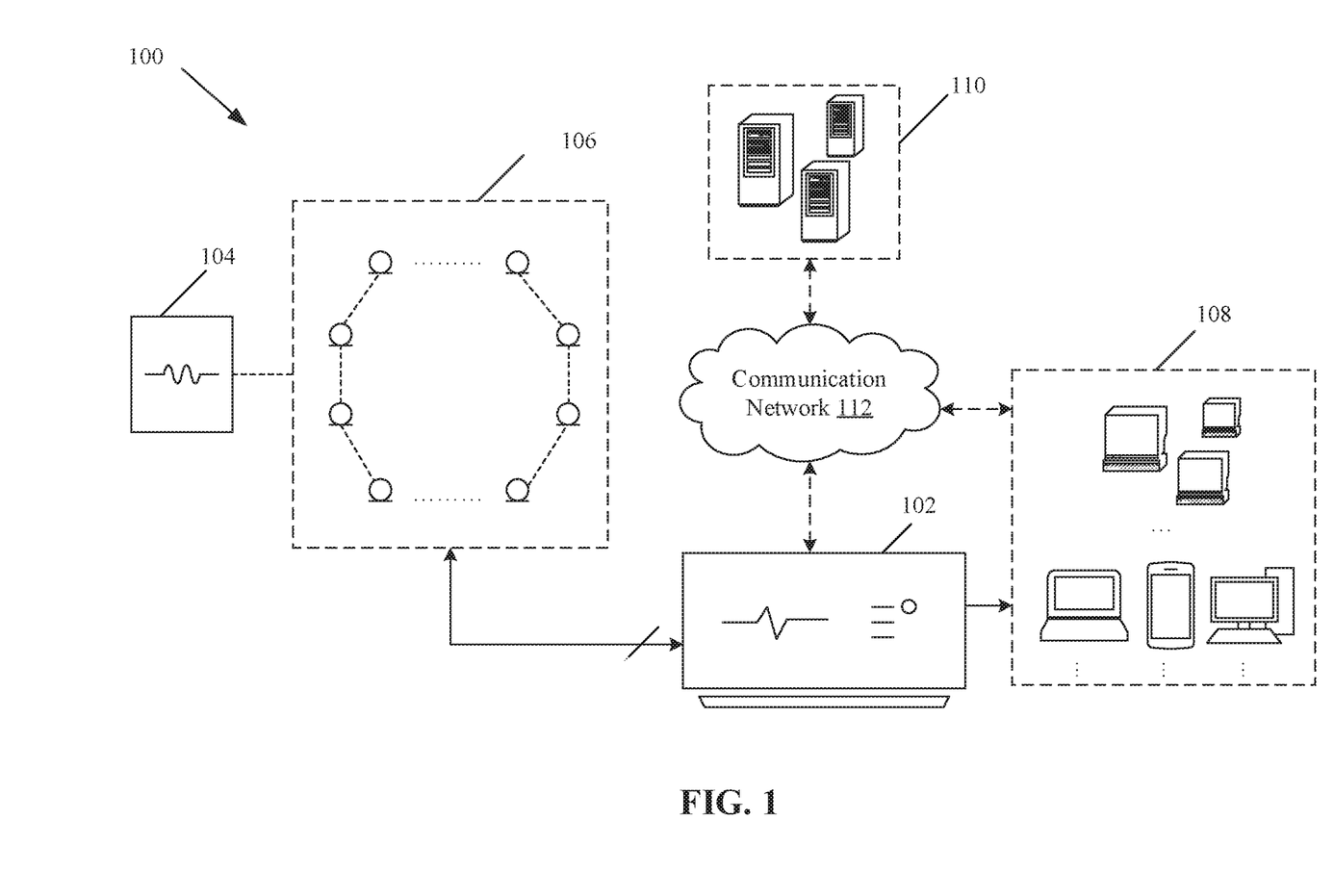
FIG. 1 is a block diagram that illustrates an exemplary environment for estimation of direction of arrival of signals from an acoustic source using sub-array selection, in accordance with an exemplary embodiment of the disclosure.

FIG. 1 is a block diagram that illustrates an exemplary environment for estimation of direction of arrival of signals from an acoustic source using sub-array selection, in accordance with an exemplary embodiment of the disclosure. In FIG. 1, there is shown a communication environment 100 that comprises a signal processing apparatus 102, a signal source 104, a microphone-array 106, one or more communication devices 108, a data server 110, and a communication network 112.

In accordance with an embodiment, as illustrated in FIG. 1, the microphone-array 106, the one or more communication devices 108, and the data server 110 may be communicatively coupled to the signal processing apparatus 102, via the communication network 112, to form a direction of arrival estimation system. However, the disclosure may not be so limited, and in accordance with another embodiment, the microphone-array 106 and the signal processing apparatus 102 may be integrated as a single device, without deviation from the scope of the disclosure.

The communication environment 100 may correspond to a closed environment or an open environment. Examples of the closed environment may include, but are not limited to, interiors of offices, physical stores, vehicles, indoor stadiums, airplane, or halls. Examples of the open environment may include, but are not limited to, an outdoor area, road, outdoor stadiums, swimming pools, rocky terrains, or ship decks. In accordance with an embodiment, the communication environment 100 may further comprise at least one of a reverb source, a babble noise source, a white noise source, a Gaussian noise source, and a diffused noise field (not shown). Such sources may be detected and factored during execution of operations for estimation of a direction of arrival of acoustic signals from the signal source 104.

The signal processing apparatus 102 may comprise suitable logic, circuitry, and interfaces that may be configured to process acoustic signals received at a set of microphone sub-arrays of the microphone-array 106. The signal processing apparatus 102 may be further configured to estimate a direction of arrival (hereinafter, "DOA") of the acoustic signals from the signal source 104, present in the communication environment 100. Examples of the implementation of the signal processing apparatus 102 may include, but are not limited to, a DOA estimation device, an audio/video conferencing system, an automatic camera steering system, a human-machine interface, a speech processing system, a speaker system, a gaming device, an audio surveillance apparatus, and other electronic devices that process the acoustic signals.

The signal source 104 may comprise suitable logic, circuitry, and interfaces that may generate acoustic signals. The acoustic signals may be generated for one or more users present in the communication environment 100. Alternatively, the acoustic signals may be generated as test signals for the estimation of DOA of the acoustic signals. In accordance with an embodiment, the signal source 104 may be a speaker-device integrated or peripherally coupled with one of a television, a mobile phone, a music-system, or a sound/speech output system. In accordance with an exemplary embodiment, the signal source 104 may be different sound emitting sources, for example, a human-speaker or a group of human-speakers present in defined limits of the communication environment 100. In accordance with an embodiment, the signal source 104 may be implemented as a network-enabled speaker that retrieves media from the data server 110, via the communication network 112. In some embodiments, the playback of the media may generate the acoustic signals.

The microphone-array 106 may comprise suitable logic, circuitry, and interfaces that may be configured to receive (or capture) the acoustic signals from the signal source 104. Thereafter, the microphone-array 106 may be configured to transmit the acoustic signals to the signal processing apparatus 102, for the estimation of the DOA of the acoustic signals. The microphone-array 106 may comprise a plurality of microphones, from which a plurality of microphone sub-arrays may be identified. Each microphone sub-array of the identified plurality of microphone sub-arrays may comprise a pair of microphones, which may be spaced apart by a specific distance in the microphone-array 106. The plurality of microphones may be arranged in the microphone-array 106 in a regular convex polygon arrangement, such as a regular hexagon. The arrangement of the plurality of microphone in the microphone-array 106 is shown and described, for example, in FIGS. 3A and 3B. Each microphone in the microphone-array 106 may be arranged at vertices of the regular convex polygon arrangement. In some embodiments, the microphone-array 106 may be implemented as a separate device that may be communicatively coupled to the signal processing apparatus 102. In some embodiments, the microphone-array 106 and the signal processing apparatus 102 may be implemented within an integrated apparatus.

The one or more communication devices 108 may comprise suitable logic, circuitry, and interfaces that may be configured to receive the estimated DOA of the acoustic signals from the signal processing apparatus 102. Each communication device of the one or more communication devices 108 may be communicatively coupled with the signal processing apparatus 102, via the communication network 112. Each communication device may be a networked or a stand-alone computation device for a specific application or systems associated with the estimation of the DOA of the acoustic signals emanated from signal source 104. Example of the specific application or systems may include, but are not limited to, virtual assistants, camera pointing systems, video conferencing, teleconferencing, human-machine interfaces, voice-activated services, or home-automation control. Other examples of the one or more communication devices 108 may include, but are not limited to, speakers, smart-speakers, workstations, servers, laptops, desktop computers, mobile devices, non-mobile devices, input/output (I/O) devices, and virtual machines.

The data server 110 may comprise suitable logic, circuitry, and interfaces that may be configured to receive, manage, store, and communicate data, such as audio data or speech data, with at least one of the signal processing apparatus 102 and the one or more communication devices 108, via the communication network 112. In a certain implementation, the acoustic signals (as sound files) may be digitally stored at (or streamed by) the data server 110. Such an implementation of the data server 110 may be found in applications, such as video conferencing, remote call conferencing, or other DOA-specific tasks, where a primary source of the acoustic signals may be present remotely with reference to the signal source 104.

The communication network 112 may comprise suitable logic, circuitry, and interfaces that may be configured to provide a plurality of network ports and a plurality of communication channels for transmission and reception of data, such as instructions or storable versions of the acoustic signals. The communication network 112 may be a wired or wireless communication channel or network. Examples of the communication network 112 may include, but are not limited to, a Wireless Fidelity (Wi-Fi) network, a Local Area Network (LAN), a wireless personal area network (WPAN), a Wireless Local Area Network (WLAN), a wireless wide area network (WWAN), a cloud network, a Long Term Evolution (LTE) network, a plain old telephone service (POTS), a Metropolitan Area Network (MAN), and/or the Internet. Various devices in the exemplary communication environment may be configured to connect to the communication network 112, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, Long Term Evolution (LTE), Light Fidelity (Li-Fi), and/or other cellular communication protocols or Bluetooth (BT) communication protocols, including variants thereof.

In operation, the signal source 104 may emit acoustic signals in the communication environment 100. The generated acoustic signals may comprise at least one of a speech signal, an audio beacon, and an audio signal different from the speech signal. The audio beacon may be ultrasonic audio beacons or audible audio beacon. Such acoustic signals may be transmitted such that at least one lobe of the acoustic signals may point in a specific look direction or region of the communication environment 100. The acoustic signals may be spread as omnidirectional signals in the communication environment 100 with a uniform or non-uniform distribution of signal energy. In certain situations, a part or majority of the acoustic signals may be directed towards a region comprising the microphone-array 106.

The signal processing apparatus 102 may be communicably coupled with each microphone in the microphone-array 106, via one of electrical buses, wireless communication channels, or the communication network 112. In accordance with an embodiment, the signal processing apparatus 102 may be activated based on monitoring of activities or certain application-specific operations within the communication environment 100. In some embodiments, the signal processing apparatus 102 may be activated based on a trigger signal. Such trigger signal may be received based on detection of acoustic signals in the communication environment 100, a speech-input from a human-speaker, or receipt of data from the microphone-array 106.

Initially, the signal processing apparatus 102 may be configured to identify a plurality of microphone sub-arrays from the plurality of microphones in the microphone-array 106. Each identified microphone sub-array of the plurality of microphone sub-arrays may comprise a pair of microphones spaced apart by a specific distance, for example, a specific distance equal to a length of a diagonal of a hexagonal planar arrangement of microphones in the microphone-array 106. Alternatively stated, the identified plurality of microphone sub-arrays may correspond to the possible number of microphone pairs, where the two microphones of a microphone pair are separated by a maximum distance in the microphone-array 106.

The signal processing apparatus 102 may be further configured to select a set of microphone sub-arrays from the identified plurality of microphone sub-arrays of the microphone-array 106. The selection of the set of microphone sub-arrays may be based on a maximum distance between each pair of microphones of the identified plurality of microphone sub-arrays of the microphone-array 106. Such selection of the set of microphone sub-arrays may be referred to as sub-array decomposition of the microphone-array 106. The selection of the set of microphone sub-arrays may be done further based on a planar arrangement of the plurality of microphone sub-arrays that bisect each other in the microphone-array 106.

In accordance with an embodiment, the plurality of microphones may be arranged in the microphone-array 106 in a regular convex polygon arrangement with even number of microphones, where each microphone in the microphone-array 106 may be arranged at vertices of the regular convex polygon. The selection of the set of microphone sub-arrays in the microphone-array 106 may be done further based on a specific alignment of different pairs of microphones of the set of microphone sub-arrays. For example, each selected microphone sub-array may include a pair of microphones in which one microphone may be aligned diagonally opposite to other microphone.

In some embodiments, the signal processing apparatus 102 may selectively activate each microphone in the selected set of microphone sub-arrays to receive the acoustic signals from the signal source 104. The signal processing apparatus 102 may further compute a relative time-delay for each microphone sub-array of the selected set of microphone sub-arrays. The relative time-delay may correspond to an estimated time-delay for the arrival of acoustic signals between each pair of microphones of the selected set of microphone sub-arrays. In some embodiments, for each selected microphone sub-array, the relative time-delay may be computed from a cross-correlation of the acoustic signals at each microphone in the pair of microphones of the selected set of microphone sub-arrays. The computed relative time-delay for each selected microphone sub-array may be compared only with other selected microphone sub-arrays instead of all microphones in the microphone-array 106. The comparison may further be factored on the basis of a maximum value of time-delay, for example a maximum time-delay of "3.5 milliseconds" for a pair (1,4) of microphones, from a set of time-delay of "1.8 milliseconds", "2.5 milliseconds", and "3.5 milliseconds". A primary purpose of determination of the microphone sub-array with the maximum relative time-delay is to identify a desired microphone pair that is aligned along an axis with a minimum angular separation (or nearest to) from the signal source 104 (See FIGS. 3A and 3B for example).

Based on the comparison, the signal processing apparatus 102 may be configured to determine a first microphone sub-array from the selected set of microphone sub-arrays. The determined first microphone sub-array may be a desired microphone sub-array from the identified plurality of microphone sub-arrays in the microphone-array 106. The determined first microphone sub-array may exhibit a maximum relative time-delay as compared to other microphone sub-arrays in the microphone sub-array. With computation of the relative time-delay for each selected microphone sub-array, a region may be determined that may be utilized to estimate the DOA of the acoustic signals with respect to the desired microphone sub-array. The region may be defined by an angular distance with reference to a radial axis associated with the microphone-array 106.

To further determine an exact DOA of the acoustic signals, the determined first microphone sub-array may be selected as the desired radial axis for determination of a relative angular separation of the determined first microphone sub-array from the signal source 104. Thereafter, the signal processing apparatus 102 may estimate the DOA of the acoustic signals based on the computed relative time-delay for the desired microphone sub-array. Alternatively stated, the signal processing apparatus 102 may utilize the relative time-delay computed previously for the desired (or the first) microphone sub-array to estimate the DOA of the acoustic signals. The DOA of the acoustic signals may be same as an angular separation of the signal source 104 from the determined first microphone sub-array.

Figure 2:
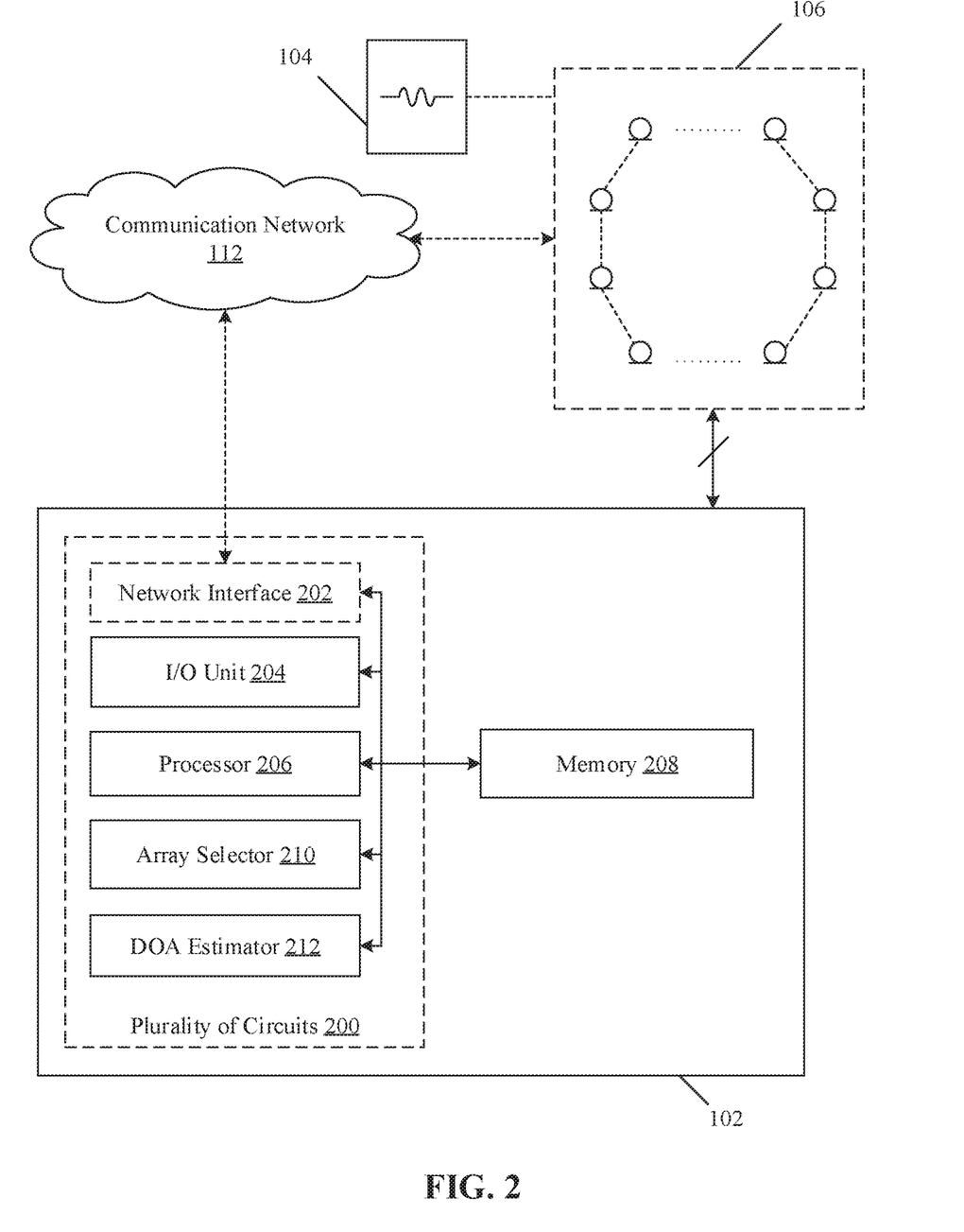
FIG. 2 is a block diagram that illustrates an exemplary signal processing apparatus estimation of direction of arrival of signals from an acoustic source using sub-array selection, in accordance with an exemplary embodiment of the disclosure.

FIG. 2 is a block diagram that illustrates an exemplary signal processing apparatus for estimation of DOA of acoustic signals from an acoustic source using sub-array selection, in accordance with an exemplary embodiment of the disclosure. FIG. 2 is described in conjunction with elements from FIG. 1. In FIG. 2, there is shown a block diagram of the signal processing apparatus 102 that may include a plurality of circuits 200, such as a network interface 202, an Input/output (I/O) unit 204, a processor 206, an array selector 210, and a DOA estimator 212. The signal processing apparatus 102 may additionally include a memory 208 communicably coupled to the I/O unit 204, the processor 206, and the network interface 202.

The network interface 202 may comprise suitable logic, circuitry, interfaces that may be configured to communicate with other systems and devices communicably coupled to the signal processing apparatus 102, via the communication network 112. The network interface 202 may be implemented by use of known technologies to support wired or wireless communication of the signal processing apparatus 102 with the communication network 112. Components of the network interface 202 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer circuitry. The network interface 202 may be configured to communicate with the one or more communication devices 108, via the communication network 112, under the control of the processor 206.

The I/O unit 204 may comprise suitable logic, circuitry, and interfaces that may be configured to receive signal data from the microphone-array 106 and information associated with the planar arrangement of each microphone in the microphone-array 106. Additionally, the I/O unit 204 may receive requests to fetch the signal data from the one or more components, such as the data server 110 or the memory 208 of the signal processing apparatus 102. The I/O unit 204 may be configured to receive one or more communication requests from external devices, such as the smartphones, smart speakers, and televisions, a human speaker, or the data server 110. The I/O unit 204 may include one or more physical communication ports and one or more virtual network ports to facilitate reception and transmission of the communication requests and/or signal data.

The processor 206 may comprise suitable logic, circuitry, and interfaces that may be configured to process the acoustic signals from a set of microphone sub-arrays of the microphone-array 106. The processor 206 may be configured to perform various operations, such as computation of transforms, responses, signal quantization, sampling, signal compression, delay estimation, and/or phase estimation. The processor 206 may be communicatively coupled with the network interface 202, the I/O unit 204, the memory 208, and other circuitries associated with the signal processing apparatus 102. Examples of the processor 206 may be an Application-Specific Integrated Circuit (ASIC) processor, a Digital signal processing (DSP)-based processor, a Complex Instruction Set Computing (CISC) processor, and/or other control circuits.

The memory 208 may comprise suitable logic, circuitry, and interfaces that may be configured to store instructions and resources associated with execution of operations, for the estimation of the DOA of the acoustic signals that emanate from the signal source 104. Examples of memory 208 may include, but are not limited to, a static random access memory (SRAM), a dynamic random access memory (DRAM), a flash memory, an electrically erasable programmable read-only memory (EEPROM), an erasable programmable read-only memory (EPROM), or a programmable read-only memory (PROM). Additionally, the memory 208 may be a magnetic storage drive (HDD) or a solid state drive (SSD) for a persistent storage of the signal data. Alternatively, a set of centralized or distributed network of peripheral memory devices may be interfaced and bridged with the signal processing apparatus 102, via the I/O unit 204.

The array selector 210 may comprise suitable logic, circuitry, and interfaces that may be configured to select a set of microphone sub-arrays from the plurality of microphone sub-arrays in the microphone-array 106. The set of microphone sub-arrays may be selected in conjunction with operations executed by the processor 206 in the memory 208.

The DOA estimator 212 may comprise suitable logic, circuitry, and interfaces that may be configured to estimate the DOA of the acoustic signals with reference to the microphone-array 106. The DOA of the acoustic signals may correspond to a relative angular separation between a desired axis (of a specific microphone sub-array) of the microphone-array 106 and the signal source 104. The DOA of the acoustic signals, associated with the signal source 104, may be determined in conjunction with operations executed by the processor 206 of the signal processing apparatus 102.

In operation, the processor 206 may be configured to receive control signals to initialize DOA estimation of the acoustic signals that emanate from the signal source 104. The control signals may be received from circuits peripheral to the signal processing apparatus 102 or routines executed within the signal processing apparatus 102. For example, a polling cycle in the processor 206 may be executed to check for relevant-activity in the communication environment 100. Example of the relevant-activity may include, but is not limited to, an arrival of a signal source 104, an acoustic beacon from a media device, and an input from a user, such as a voice-enabled input, a gesture-enabled input, and a touch-enabled input.

The processor 206 may be configured to execute instructions or routines along with associated resources for different operations associated with the DOA estimation of the acoustic signals with respect to the signal source 104. The instructions or routines along with associated resources may be stored in the memory 208. Accordingly, the processor 206 may allocate process threads from a thread pool, to each operation for the DOA estimation of the acoustic signals, in near real time. Such an allocation may be serial or parallel such that the execution and results may be generated in an optimal time-period.

In accordance with an embodiment, the signal processing apparatus 102 may be communicably coupled to each microphone in the microphone-array 106, via the communication network 112. In such an implementation, the microphone-array 106 may communicate to the signal processing apparatus 102 via the network interface 202 of the signal processing apparatus 102. In accordance with an embodiment, the signal processing apparatus 102 may be communicably coupled as a peripheral circuit, via communication buses or channels. In such an implementation, the microphone-array 106 may communicate with the signal processing apparatus 102 via the I/O unit 204 of the signal processing apparatus 102.

The array selector 210 may be configured to retrieve information associated with a planar arrangement of the microphone-array 106. The information may be retrieved from one of storage, such as the memory 208, in the signal processing apparatus 102 or a database on the data server 110. The information may comprise one or more attributes (hereinafter, "attributes") associated with the microphone-array 106. The attributes may include, but are not limited to, a location coordinate of each microphone within the planar arrangement of the microphone-array 106, a location coordinate associated with a center of the planar arrangement associated with the microphone-array 106, and a radius of the planar arrangement associated with the microphone-array 106. The array selector 210 may further be configured to identify a plurality of microphone sub-arrays from the plurality of microphones in the microphone-array 106. Each microphone sub-array of the identified plurality of microphone sub-arrays may comprise a pair of microphones spaced apart by a specific distance. Such identification of the plurality of microphone sub-arrays may be based on possible pairs of microphones evaluated from the retrieved attributes of the microphone-array 106. Each sub-array in the microphone-array 106 may comprise a pair of microphones, arranged at the vertices of the planar arrangement, with even number of microphones.

Figure 3A:
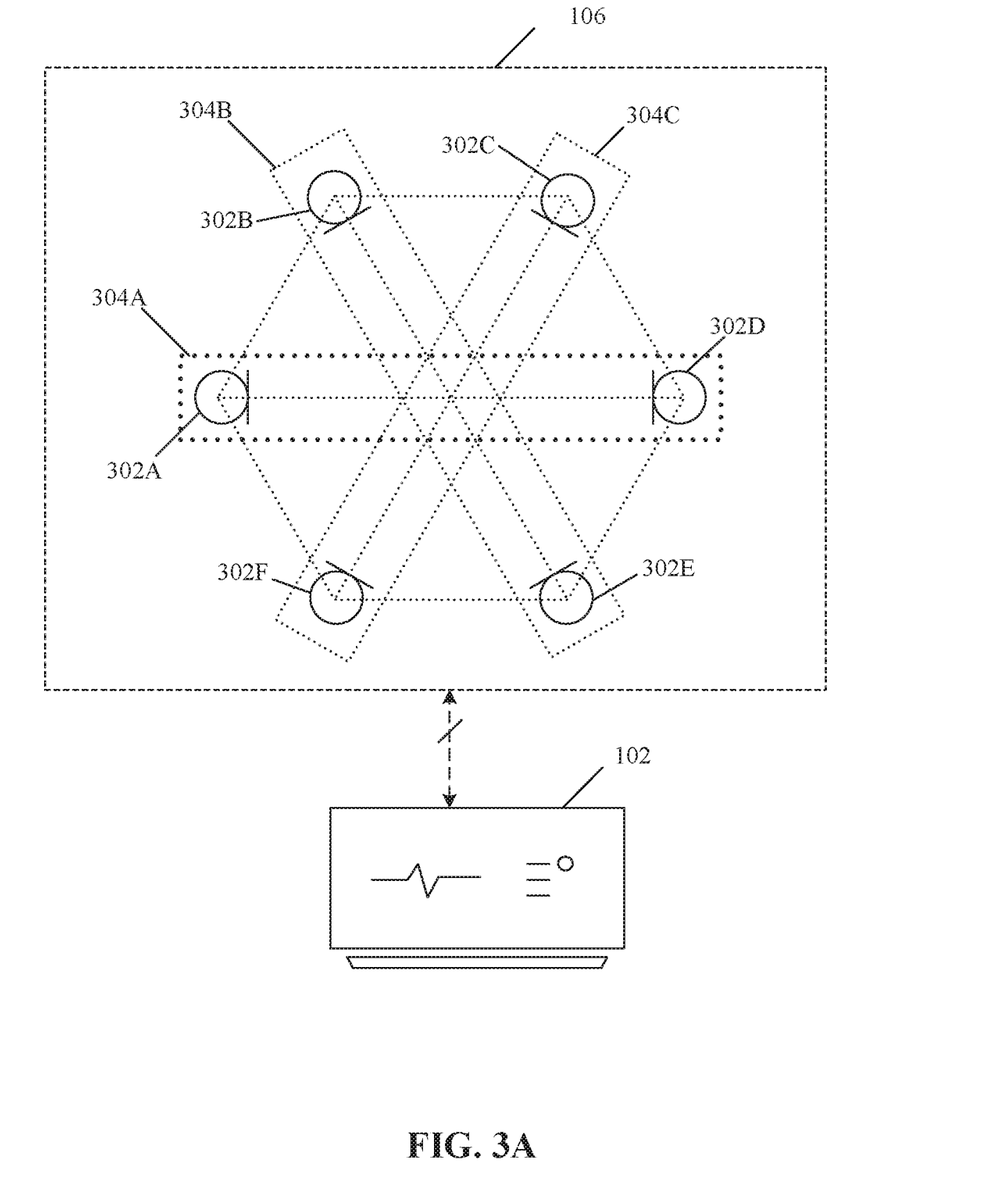
FIGS. 3A and 3B are exemplary scenarios that illustrate a configuration of a microphone-array for estimation of direction of arrival of signals from an acoustic source using sub-array selection by the signal processing apparatus of FIG. 2, in accordance with an embodiment of the disclosure.
Figure 3B:
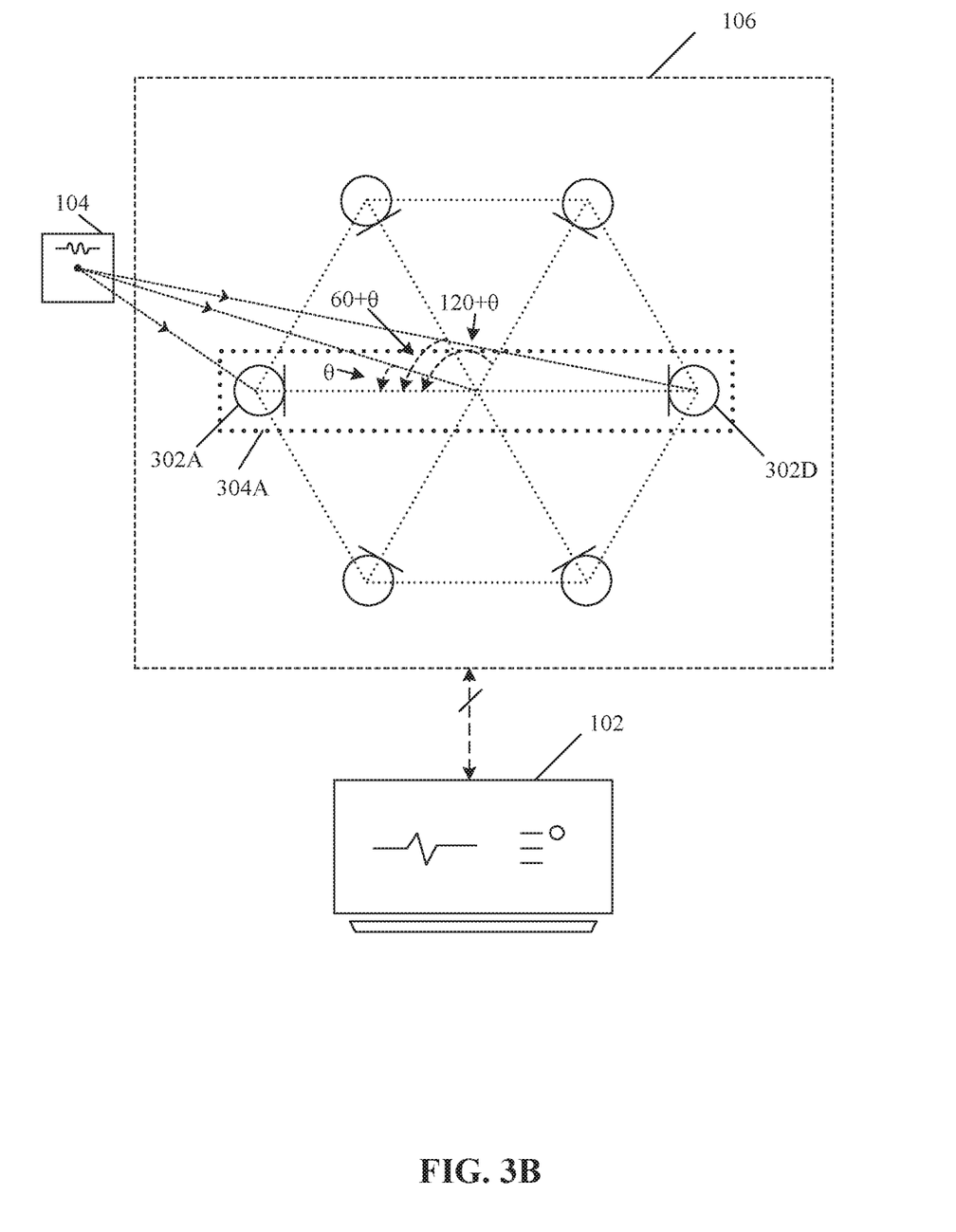

For example, a microphone-array 106 may be arranged in a regular convex hexagon arrangement. The microphone-array 106 may comprise a total of "6" microphones, arranged at vertices of the regular convex hexagon arrangement. Based on the arrangement, a total of $^6C_2$ pairs of microphones may be identified by the array selector 210, where $^6C_2$ specifies a possible combination of pairs of microphones from a given set of 6 microphones. Alternatively stated, the array selector 210 may identify 15 microphone sub-arrays in the microphone-array 106. Such 15 sub-arrays may be specified as (1,2), (1,3), (1,4), (1.5), (1,6), (2,3), (2,4), (2,5), (2,6), (3,4), (3,5), (3,6), (4,5), (4,6), (5,6). Here, each number uniquely denotes a microphone in the microphone-array 106 (as shown in FIG. 3A and FIG. 3B).

The array selector 210, in conjunction with the processor 206, may be further configured to select a set of microphone sub-arrays from the possible plurality of microphone sub-arrays, identified from the microphone-array 106. The selection of the set of microphone sub-arrays may be based on a maximum distance between each pair of microphones of the identified plurality of microphone sub-arrays of the microphone-array 106. Such selection of the set of microphone sub-arrays may be referred to as sub-array decomposition of the microphone-array 106. The set of sub-arrays may be selected to identify a reference axis for the DOA estimation of the acoustic signals that emanates from the signal source 104. Additionally, it is advantageous to select the set of sub-arrays from the plurality of microphone sub-arrays to minimize a number of iterative computations for each identified plurality of microphone sub-arrays (or possible pairs of microphones) of the microphone-array 106. Therefore, the selection of the set of microphone sub-arrays advantageously reduces a redundancy in a number of calculations executed to optimally and swiftly estimate the DOA of the acoustic signals.

The selection of the set of microphone sub-arrays from the microphone-array 106 may be further based on a planar arrangement of the plurality of microphone sub-arrays that bisect each other in the microphone-array 106. Alternatively stated, only specific microphone sub-arrays may be selected that equally divide an area of the planar arrangement of the microphone-array 106. For example, a microphone sub-array is selected when such sub-array is present along a diagonal of the regular hexagonal arrangement of the microphone-array 106 and divides the hexagonal area into two equal halves. The selection of the set of microphone sub-arrays from the microphone-array 106 may be further based on an alignment of different pairs of microphones of the set of microphone sub-arrays. Each selected microphone sub-array may include a pair of microphones in which one microphone is aligned diagonally opposite to other microphone. The array selector 210 may be further configured to factor each of the aforementioned conditions, such as, maximum separation, bisection, and alignment, to optimally select the set of microphone sub-arrays from the possible plurality of microphone sub-arrays in the microphone-array 106.

After the selection, the DOA estimator 212 may be configured to compute a relative time-delay for the arrival of the acoustic signals between each pair of microphones of the selected set of microphone sub-arrays. In accordance with an embodiment, for each of the selected set of microphone sub-arrays, the relative time-delay may be computed based on a cross-correlation of the acoustic signals received at two different microphones of the selected set of microphone sub-arrays.

For example, the acoustic signals from the signal source 104 may be represented as $X(n)$. Accordingly, the acoustic signals received at a first microphone and a second microphone of the selected set of microphone sub-arrays may be represented as $X_1(n)$ and $X_2(n)$, respectively. $X_1(n)$ and $X_2(n)$ may be represented by equation (1) and (2) as follows:

$$X_1(n)=aX(n+T_1) \quad (1)$$

$$X_2(n)=bX(n+T_2) \quad (2)$$

Where "a" and "b" are signal amplitudes factors for the first microphone and the second microphone of the selected set of microphone sub-arrays. "$T_1$" and "$T_2$" represents the time of arrival of the acoustic signals at the first microphone and the second microphone, respectively. "T1" and "T2" is representative of phase shifts in the acoustic signals at the first microphone and the second microphone of the selected set of microphone sub-arrays, respectively. The cross-correlation of the $X_1(n)$ and $X_2(n)$ may be computed in a frequency domain or time domain. In frequency domain, the DOA estimator 212 may be configured to implement a Fast-Fourier Transform (FFT) of the acoustic signals received at the two different microphones of the selected set of microphone sub-arrays.

In continuation with the above example, the cross-correlation may be represented as $R_{12}(n)$ and given by equation (3) in time domain as follows:

$$R_{12}(n)=\Sigma X_1(n) \times X_2(n-T) \quad (3)$$

From equation (3), the cross-correlation for the acoustic signals in the time domain may be a discretized summation of a product of the acoustic signal at the first microphone and the time-delay acoustic signals at the second microphone of the selected set of microphone sub-arrays. The DOA estimator 212 may be further configured to estimate the cross-correlation of equation (3) in the frequency domain.

In some instances, the cross-correlation may be computed in time domain. Equations (3) may be given in frequency domain by equation (4) and (5) as:

$$R_{12}(w)=\text{FFT}(X_1(n)) \times \text{Conjugate FFT}(X_2(n)) \quad (4)$$

$$R_{12}(w)=ke^{jw(T_1-T_2)}|X(w)|^2 \quad (5)$$

where "k" is a constant, "w" is the frequency component of the acoustic signals received at the selected set of microphone sub-arrays of the microphone-array 106, and $|X(w)|^2$ is the energy spectral-density of the acoustic signals $X(n)$. From equation (4) and (5), the cross-correlation is a represented as a complex exponential form of the acoustic signals where $(T_1-T_2)$ may provide the relative time-delay for one of the selected set of microphone sub-arrays. Similarly, the relative time-delay for each of the selected set of microphone sub-arrays may be computed and stored in the memory 208 of the signal processing apparatus 102.

In accordance with another embodiment, the relative time-delay for each of the selected set of microphone sub-arrays may be computed based on a defined digital signal processing technique in the time domain or the frequency domain, for example, Phase Transform (PHAT), Maximum Likelihood Estimation (MLE), Adaptive Least Mean Square (LMS) Filter, Average Square Different Function (ASDF), and the like. The relative time-delay may correspond to an estimated time-delay for the arrival of acoustic signals between each pair of microphones of the selected set of microphone sub-arrays. The relative time-delay may be computed for each selected microphone sub-array instead of computation for each microphone sub-array in the microphone-array 106. Such reduction in number of computations/measurements may advantageously reduce a complexity of the operations and thereby facilitate faster estimation of the DOA of the acoustic signals. The computed relative time-delay may be stored in the memory 208 of the signal processing apparatus 102 and/or in a database of the computed relative time-delays.

The DOA estimator 212 may be further configured to determine a first microphone sub-array from the selected set of microphone sub-arrays. The determined first microphone sub-array may be a desired microphone sub-array from the identified plurality of microphone sub-arrays in the microphone-array 106. The determined first microphone sub-array may have lowest angular separation with the signal source 104, with reference to a geometrical center of the planar arrangement of the microphone-array 106. Accordingly, the determined first microphone sub-array may further exhibit a maximum relative time-delay. Such maximum delay may be exhibited because of a presence of the signal source 104 proximally to a longitudinal axis of the desired microphone sub-array. Therefore, the selection of the desired microphone sub-array may be based on a maximum time-delay from the computed relative time-delay for each of the selected set of microphone sub-arrays.

In accordance with an embodiment, the determined first microphone sub-array may be determined from the selected set of microphone sub-arrays when an angular separation between the signal source 104 and a selected microphone sub-array is in a defined range. Such a condition has been quantitatively described in FIGS. 3A and 3B. For example, a relative time-delay for "5 microphone sub-arrays" may be "1 milliseconds", "2.92 milliseconds", "2.88 milliseconds", "3.14 milliseconds", and "2.8 milliseconds". Therefore, the relative time-delay of "3.14 milliseconds" may be identified as the maximum relative time-delay and accordingly, the microphone sub-array with the relative time-delay of "3.14 milliseconds" may be set as the desired microphone sub-array for the estimation of the DOA of the acoustic signals.

The DOA estimator 212 may be further configured to estimate the DOA of the acoustic signals with reference to the determined first microphone sub-array. In some embodiments, the estimation of the DOA of the acoustic signals may be done based on the computed relative time-delay for arrival of the acoustic signals at the determined first microphone sub-array. Alternatively stated, the DOA may be estimated based on the computed relative time-delay for the desired microphone sub-array and a relationship of the computed relative time-delay with one or more parameters (an example of the relationship is reflected in equation (6)). The one or more parameters may comprise a sampling frequency of the acoustic signals, a speed of acoustic signals, and a radius associated with a planar arrangement of the microphone-array 106.

For example, for "$T_D$" as the relative time-delay "$T_1$-$T_2$" for the desired microphone sub-array (or the determined first microphone sub-array), "r" as radius of the planar arrangement, "$f_s$" as sampling frequency, and "$v_s$" as speed of the acoustic signals, the DOA as "θ" (in degrees) may be given by equation (6) and (7) as follows:

$$T_D = \frac{2rf_s \cos\theta}{v_s} \quad (6)$$

$$\theta(\text{in degree}) = \cos^{-1}\frac{T_D v_s}{2rf_s} \quad (7)$$

From equation (6) and (7), the DOA (θ) for the acoustic signals from the signal source 104 may be a dependent on the relative time-delay ($T_D$) for the desired microphone sub-array (or the determined first microphone sub-array), the speed of the acoustic signals ($v_s$), the radius (r) of the planar arrangement, and the sampling frequency ($f_s$). Of aforementioned parameters, the DOA estimator 212 may parametrically adjust the sampling frequency ($f_s$) and the radius (r) of the microphone-array 106 to obtain optimum values that provide improved results for the direction of arrival of the acoustic signals. Further, the speed of the acoustic signals is usually a constant in a given medium, and therefore, the DOA (θ) is primarily dependent on the relative time-delay $T_D$, and may be represented by equation (8) as follows:

$$\theta = \cos^{-1} k_1 T_D = \text{Function}[T_D] \quad (8)$$

From equation (8), "$k_1$" is a constant value that comprises the radius (r), the sampling frequency ($f_s$), and the speed of the acoustic signals ($v_s$). Therefore, the value of θ is completely a function of the relative time-delay for the determined first microphone sub-array.

In other embodiments, the direction of arrival of the acoustic signals with reference to the determined first microphone sub-array may be estimated based on a digital filter. Such digital filter may implement a defined signal processing technique and process the acoustic signals received at a first microphone and a second microphone of the determined first microphone sub-array, to estimate the DOA of the acoustic signals. The digital filter for the estimation of the DOA of the acoustic signals may be one of an infinite impulse response (IIR)-based filter or a finite impulse response (FIR)-based filter. Such IIR-based filter or the FIR-based filter may process the acoustic signals based on one of a cross-correlation, a Fast Fourier Transform (FFT), a Discrete Fourier Transform (DFT) of the acoustic signals, and the like.

In some embodiments, the acoustic signals may be directed towards a region different from the region comprising the microphone-array 106. A fraction of signal energy of the acoustic signals may suffer reflections with different types of reflecting surfaces in the communication environment 100. Such reflections for the fraction of the signal energy associated with the acoustic signals may cause a phase-shift of the acoustic signals and increase a noise-correlation in the acoustic signals. Therefore, different fractions of the acoustic signals may reach the microphone-array 106 at different times. The signal processing apparatus 102 may factor such conditions and reflections of the acoustic signal while determining the DOA of the acoustic signal from the signal source 104. In some embodiments, the arrangement of the microphone-array 106 may be done such that the microphone-array 106 may be receptive and sensitive to the acoustic signals from every direction in the communication environment 100. Additionally, the position of the microphone-array 106 in the communication environment 100 may be selected such that the microphone-array 106 may receive a maximum of the signal energy associated with the acoustic signals. An extent of signal energy of the acoustic signals that reaches the microphone-array 106 may be further based on a distance between the signal source 104 and the microphone-array 106, a plane of the signal source 104 and the microphone-array 106, types of absorbing components in the communication environment 100, and the signal energy of the acoustic signal.

FIGS. 3A and 3B are exemplary scenarios that illustrate a configuration of a microphone-array for estimation of direction of arrival of signals from an acoustic source using sub-array selection by the signal processing apparatus of FIG. 2, in accordance with an embodiment of the disclosure. FIGS. 3A and 3B are explained in conjunction with elements from the FIGS. 1 and 2. With reference to FIG. 3A, there is shown the microphone-array 106 communicatively coupled to the signal processing apparatus 102. As shown, the microphone-array 106 comprises a plurality of microphones 302A to 302F. The plurality of microphones 302A to 302F in the microphone-array 106 may be analyzed to identify a possible plurality of microphone sub-arrays, of which a selected set of microphone sub-arrays are shown in dotted lines in the FIG. 3A. The selected set of microphone sub-arrays may comprise a first microphone sub-array 304A, a second microphone sub-array 304B, and a third microphone sub-array 304C.

The microphone-array 106 comprises six microphones, such as the plurality of microphones 302A to 302F, arranged at vertices of a regular hexagon. The plurality of microphone sub-arrays may be identified from a sum of total number of diagonals and the number of sides of the planar arrangement. The plurality of microphone sub-arrays (M(n)) may be given by equation (9) as:

$$M(n) = \frac{n(n-3)}{2} + n \quad (9)$$

Where "n" represents the number of sides of the regular polygon arrangement. For example, using equation (9), the number of possible microphone sub-arrays for a regular hexagon arrangement may be "6(6−3)/2+6", i.e. 15 microphone sub-arrays.

The signal processing apparatus 102 may select "3 microphone sub-arrays", i.e. the first microphone sub-array 304A, the second microphone sub-array 304B, and the third microphone sub-array 304C from the possible configurations of 15 microphone sub-arrays. The selection of "3 microphone" sub-arrays in the hexagon arrangement is advantageous as the selected "3 microphone sub-arrays" optimally envelope a 360 degree view of the communication environment 100. Further, the selection of the first microphone sub-array 304A, the second microphone sub-array 304B, and the third microphone sub-array 304C, may be further based on the maximum separation between at least two microphones of the of the plurality of microphones of the microphone-array 106. Moreover, the selected "3 microphone sub-arrays" individually bisect the hexagonal arrangement associated with the microphone-array 106.

With reference to FIG. 3B, there is shown the signal source 104 and the signal processing apparatus 102 communicatively coupled to the microphone-array 106. The signal source 104 may be assumed to be located at a specific angle (θ) from a reference axis (as shown) of the first microphone sub-array 304A, (60°+θ) with respect to a reference axis (as shown) of the second microphone sub-array 304B, and (120°+θ) with respect to a reference axis (as shown) of the third microphone sub-array 304C.

The signal processing apparatus 102 may be configured to compute the relative time-delay for each of the selected "3 microphone sub-arrays". The relative time-delay for the first microphone sub-array 304A is a maximum of all the computed relative time-delays. Instead of computing time-delays for all the 15 microphone sub-arrays, the signal processing apparatus 102 identifies the proximal microphone sub-array with respect to the signal source 104 from computed 3 time-delays.

In some embodiments, the signal processing apparatus 102 may cross-correlate the acoustic signals at the microphone 302A and the microphone 302D of the first microphone sub-array 304A. Similarly, the signal processing apparatus 102 may cross-correlate the acoustic signals at the microphones of the second microphone sub-array 304B and the third microphone sub-array 304C. The cross-correlation may lead to computation of the relative time-delay, which may be compared with a relationship of equation (6) or equation (7). In other embodiments, the signal processing apparatus 102 may compute the relative time-delay for each of the selected set of microphone sub-arrays based on a defined digital signal processing technique in the time domain or the frequency domain, for example, Phase Transform (PHAT), Maximum Likelihood Estimation (MLE), Adaptive Least Mean Square (LMS) Filter, Average Square Different Function (ASDF), and the like.

For example, table 1 shows a relationship among relative time-delays for the selected "3 microphone sub-arrays" and specific values of time-delays for θ=0°, $f_s$=16000 Hz, and r=4 centimeters.

TABLE 1

Relationship between delay values for the selected set of sub-arrays

| Sub-Array | Delay Relationship (Samples) | Specific Delay Values (Samples) |
| --- | --- | --- |
| 304A | $T_{304A}$ | 3.76 |
| 304B | $-T_{304A}/2$ | −1.88 |
| 304C | $T_{304A}/2$ | 1.88 |

From Table 1, it is evident that the first microphone sub-array 304A has the maximum delay for aforementioned conditions, and therefore, the first microphone sub-array 304A is selected as the desired microphone sub-array. It is advantageous to calculate 3 time-delays instead of 15 time-delays as computational complexity is reduced as compared to conventional techniques, such as Multiple Signal Classification (MUSIC), Steered Response Power-Phase Transform (SRP-PHAT) and Generalized Cross-Correlation (GCC).

In some embodiments, the desired microphone sub-array 304A (also referred to as the first microphone sub-array 304A) may be further determined from the selected set of microphone sub-arrays when the angular separation between the signal source 104 and the selected microphone sub-array is in a defined range. The defined range of the angular separation may be measured with respect to a specific microphone sub-array, such as the first microphone sub-array 304A. For example, if the reference axis of the first microphone sub-array 304A represents 0° line and the angle increases along clockwise direction, then the first microphone sub-array 304A is the determined first microphone sub-array when the DOA (θ) of the acoustic signals is in a range of −30° to 30° degrees for the microphone 302A and 150° to 210° for the microphone 302D. The second microphone sub-array 304B is selected as the determined first microphone sub-array when the DOA (θ) of the acoustic signals is in a range of 30° to 90° degrees for the microphone 302B and 210° to 270° for the microphone 302E. The third microphone sub-array 304C is selected as the determined first microphone sub-array when the DOA (θ) of the acoustic signals is in a range of 90° to 150° degrees for the microphone 302C and 270° to 330° for the microphone 302F.

Based on the relationship of equation (6) or equation (7) and the computed relative time-delay from equation (3) or equation (5), the DOA may be estimated. For example, for $f_s$=16 kHz, r=0.04 m, $v_s$=340 m/s, and $T_D$=3.76 samples, the signal processing apparatus 102 may determine the DOA (θ) with respect to the desired microphone sub-array 304A using equation (7) as:

$$\theta = \cos^{-1}\frac{340 \times 3.76}{2 \times 0.04 \times 16000} = \cos^{-1} 0.99875 = 2.865°$$

Figure 4:
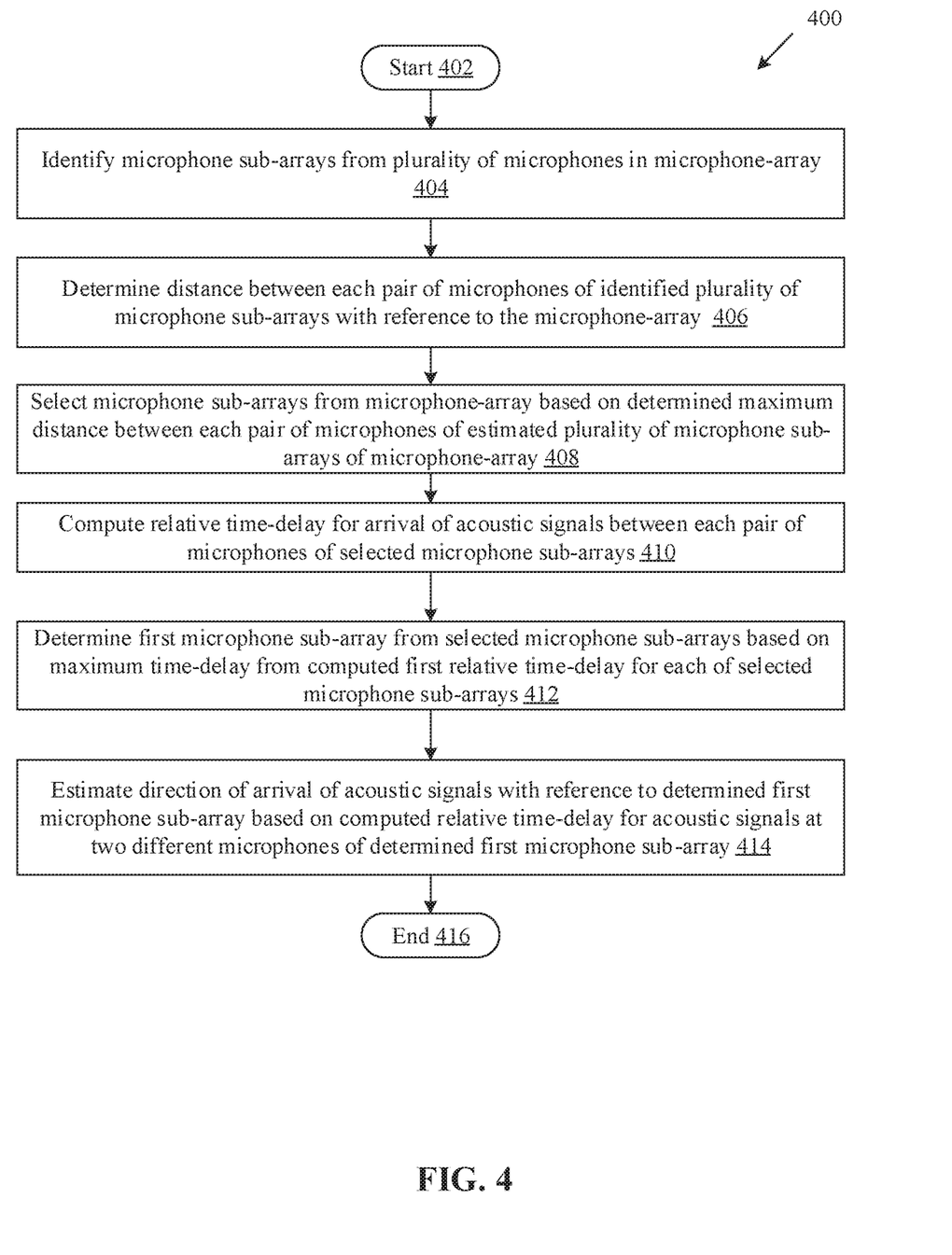
FIG. 4 is a flowchart that illustrates exemplary operations for estimation of direction of arrival of signals from an acoustic source using sub-array selection, in accordance with various exemplary embodiments of the disclosure.

FIG. 4 is a flowchart that illustrates exemplary operations for estimation of DOA of signals from an acoustic source using sub-array selection, in accordance with various exemplary embodiments of the disclosure. FIG. 4 is explained in conjunction with FIGS. 1, 2, 3A and 3B. In FIG. 4, there is shown a flowchart 400 that comprises exemplary operations from 402 through 418. The exemplary operations for the DOA estimation of the acoustic signals may start at 402 and proceed to 404.

At 404, a plurality of microphone sub-arrays may be identified from a plurality of microphones in the microphone-array 106. The array selector 210 may be configured to identify the plurality of microphone sub-arrays from the plurality of microphones in the microphone-array 106.

At 406, a distance between each pair of microphones of the identified plurality of microphone sub-arrays of the microphone-array 106 may be determined with reference to the microphone-array 106. The array selector 210, in conjunction with the processor 206, may be configured to determine the specific distance between each pair of microphones of the identified plurality of microphone sub-arrays of the microphone-array 106.

At 408, set of microphone sub-arrays may be selected from the microphone-array 106 based on a determined maximum distance between each pair of microphones of the identified plurality of microphone sub-arrays of the microphone-array 106. The array selector 210 may be configured to select a set of microphone sub-arrays from the microphone-array 106 based on the determined maximum distance between each pair of microphones of the identified plurality of microphone sub-arrays of the microphone-array 106. Such selection of the set of microphone sub-arrays may be referred to as sub-array decomposition of the microphone-array 106.

At 410, a relative time-delay may be computed for arrival of the acoustic signals between each pair of microphones of the selected set of microphone sub-arrays. The DOA estimator 212, in conjunction with the processor 206, may be configured to compute the relative time-delay for arrival of the acoustic signals between each pair of microphones of the selected set of microphone sub-arrays. Such computation of the relative time-delay may be based on the cross-correlation of the acoustic signals received at two different microphones of the set of microphone sub-arrays.

At 412, a first microphone sub-array may be determined from the selected set of microphone sub-arrays based on a maximum time-delay from computed relative time-delay for each selected set of microphone sub-arrays. The determined first microphone sub-array may be a desired microphone sub-array from the identified plurality of microphone sub-arrays in the microphone-array 106. The DOA estimator 212 may be configured to determine the determined first microphone sub-array from the selected set of microphone sub-arrays. The determination may be based on the maximum time-delay from computed relative time-delay for each selected set of microphone sub-arrays.

At 414, a DOA of the acoustic signals may be estimated with reference to the determined first microphone sub-array based on the computed relative time-delay for the acoustic signals at two different microphones of the determined first microphone sub-array (or the desired microphone sub-array). The DOA estimator 212 may be configured to estimate the DOA of the acoustic signals with reference to the determined first microphone sub-array based on the computed relative time-delay for the acoustic signals at two different microphones of the determined first microphone sub-array (or the desired microphone sub-array). Control passed to end at 416.

While the present disclosure has been described with reference to illustrative embodiments, this description is not intended to be construed in a limiting sense. Various modifications and combinations of the illustrative embodiments, as well as other embodiments of the invention, will be apparent to persons skilled in the art upon reference to the description. For example, various embodiments described above may be combined with each other.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing first one or more lines of code and may comprise a second "circuit" when executing second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g. and for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithm, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences, and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the present disclosure has been described with reference to certain embodiments, it will be noted understood by, for example, those skilled in the art that various changes and modification could be made and equivalents may be substituted without departing from the scope of the present disclosure as defined, for example, in the appended claims. In addition, many modifications may be made to adapt a particular situation or material to the teachings of the present disclosure without departing from its scope. The functions, steps, and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system for processing acoustic signals, comprising:
a microphone-array comprising a plurality of microphones; and
a signal processing apparatus comprising a plurality of circuits associated with the microphone-array, wherein the plurality of circuits is configured to:
identify a plurality of microphone sub-arrays from the plurality of microphones in the microphone-array, wherein each microphone sub-array of the identified plurality of microphone sub-arrays comprises a pair of microphones spaced apart by a specific distance;
select a set of microphone sub-arrays from the identified plurality of microphone sub-arrays of the microphone-array based on a maximum distance between each pair of microphones of the plurality of microphone sub-arrays of the microphone-array;
compute a relative time-delay for an arrival of the acoustic signals between each pair of microphones of the selected set of microphone sub-arrays, wherein the relative time-delay corresponds to an estimated time-delay for the arrival of the acoustic signals between each pair of microphones of the selected set of microphone sub-arrays;
determine a first microphone sub-array from the selected set of microphone sub-arrays based on a maximum time-delay from the computed relative time-delay for each of the selected set of microphone sub-arrays, wherein the determined first microphone sub-array is a desired microphone sub-array from the identified plurality of microphone sub-arrays in the microphone-array; and
estimate a direction of arrival of the acoustic signals with reference to the determined first microphone sub-array, based on the computed relative time-delay for the arrival of the acoustic signals at the determined first microphone sub-array.

2. The system according to claim 1, wherein the direction of arrival of the acoustic signals with reference to the determined first microphone sub-array is estimated based on one or more parameters, and wherein the one or more parameters comprises a sampling frequency of the acoustic signals, a speed of the acoustic signals, the computed relative time-delay for the determined first microphone sub-array, and a radius associated with a planar arrangement of the microphone-array.

3. The system according to claim 1, wherein the direction of arrival of the acoustic signals is estimated in one of a frequency domain and a time domain.

4. The system according to claim 1, wherein the direction of arrival of the acoustic signals with reference to the determined first microphone sub-array is estimated based on a digital filter that processes the acoustic signals received at a first microphone and a second microphone of the determined first microphone sub-array.

5. The system according to claim 4, wherein the digital filter for the estimation of the direction of arrival of the acoustic signals is one of an infinite impulse response (IIR) filter or a finite impulse response (FIR) filter that processes the acoustic signals based on one of a cross-correlation, a Fast Fourier Transform (FFT), a Discrete Fourier Transform (DFT) of the acoustic signals received at the first microphone and the second microphone of the determined first microphone sub-array.

6. The system according to claim 1, wherein the plurality of circuits is further configured to determine the specific distance between the pair of microphones of the plurality of microphone sub-arrays of the microphone-array.

7. The system according to claim 1, wherein the plurality of microphones are arranged in the microphone-array in a regular convex polygon arrangement, and wherein each microphone in the microphone-array is arranged at vertices of the regular convex polygon.

8. The system according to claim 1, wherein the selection of the set of microphone sub-arrays from the microphone-array is further based on a planar arrangement of the set of microphone sub-arrays that bisect each other in the microphone-array.

9. The system according to claim 1, wherein the first microphone sub-array is determined from the selected set of microphone sub-arrays based on a maximum of the computed relative time-delay among the selected set of microphone sub-arrays.

10. The system according to claim 1, wherein the relative time-delay for the selected set of microphone sub-arrays is computed based on a cross-correlation of the acoustic signals received at two different microphones of the selected set of microphone sub-arrays.

11. The system according to claim 1, wherein the relative time-delay is computed for each selected microphone sub-array instead of computation of the relative time-delay for each microphone sub-array in the microphone-array.

12. The system according to claim 1, wherein the direction of arrival of the acoustic signals is same as a direction that corresponds to a location of a signal source of the acoustic signals.

13. A method for processing acoustic signals, comprising:
in a signal processing apparatus that comprises a plurality of circuits that are communicatively coupled to a microphone-array:
identifying, by the plurality of circuits, a plurality of microphone sub-arrays from the plurality of microphones in the microphone-array, wherein each microphone sub-array of the identified plurality of microphone sub-arrays comprises a pair of microphones spaced apart by a specific distance;
selecting, by the plurality of circuits, a set of microphone sub-arrays from the identified plurality of microphone sub-arrays of the microphone-array based on a maximum distance between each pair of microphones of the plurality of microphone sub-arrays of the microphone-array;
computing, by the plurality of circuits, a relative time-delay for an arrival of the acoustic signals between each pair of microphones of the selected set of microphone sub-arrays, wherein the relative time-delay corresponds to an estimated time-delay for the arrival of the acoustic signals between each pair of microphones of the selected set of microphone sub-arrays;
determining, by the plurality of circuits, a first microphone sub-array from the selected set of microphone sub-arrays based on a maximum time-delay from the computed relative time-delay for each of the selected set of microphone sub-arrays, wherein the determined first microphone sub-array is a desired microphone sub-array from the identified plurality of microphone sub-arrays in the microphone-array; and
estimating, by the plurality of circuits, a direction of arrival of the acoustic signals with reference to the determined first microphone sub-array, based on the computed relative time-delay for the arrival of the acoustic signals at the determined first microphone sub-array.

14. The method according to claim 13, wherein the direction of arrival of the acoustic signals with reference to the determined first microphone sub-array is estimated based on one or more parameters, and wherein the one or more parameters comprises a sampling frequency of the acoustic signals, a speed of the acoustic signals, the computed relative time-delay for the determined first microphone sub-array, and a radius associated with a planar arrangement of the microphone-array.

15. The method according to claim 13, wherein the direction of arrival of the acoustic signals is estimated in one of a frequency domain and a time domain.

16. The method according to claim 13, further comprising determining, by the plurality of circuits, the specific distance between the pair of microphones of the plurality of microphone sub-arrays of the microphone-array.

17. The method according to claim 13, wherein the plurality of microphones are arranged in the microphone-array in a regular convex polygon arrangement, and wherein each microphone in the microphone-array is arranged at vertices of the regular convex polygon.

18. The method according to claim 13, wherein the selection of the set of microphone sub-arrays from the microphone-array is further based on a planar arrangement of the set of microphone sub-arrays that bisect each other in the microphone-array.

19. The method according to claim 13, wherein the first microphone sub-array is determined from the selected set of microphone sub-arrays based on a maximum of the computed relative time-delay among the selected set of microphone sub-arrays.

20. The method according to claim 13, wherein the relative time-delay for the selected set of microphone sub-arrays is computed based on a cross-correlation of the acoustic signals received at two different microphones of the selected set of microphone sub-arrays.

* * * * *